Aug. 2, 1932.   J. N. BLUE   1,869,795
BOX AND BEARING FOR RAILWAY VEHICLES
Filed Aug. 12, 1930   3 Sheets-Sheet 1
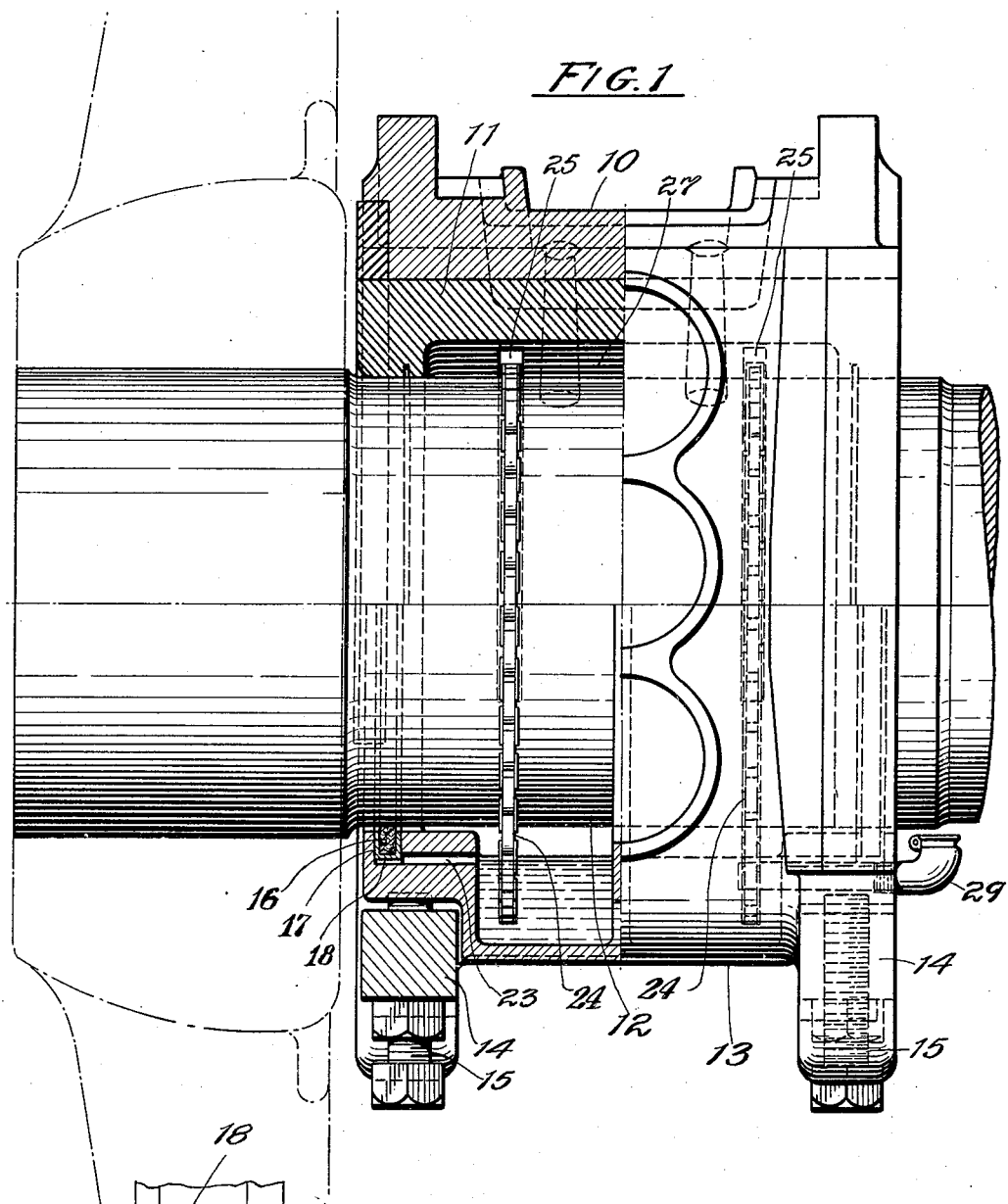
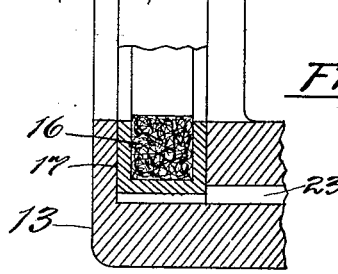
INVENTOR
JOSEPH N. BLUE
ATTY.

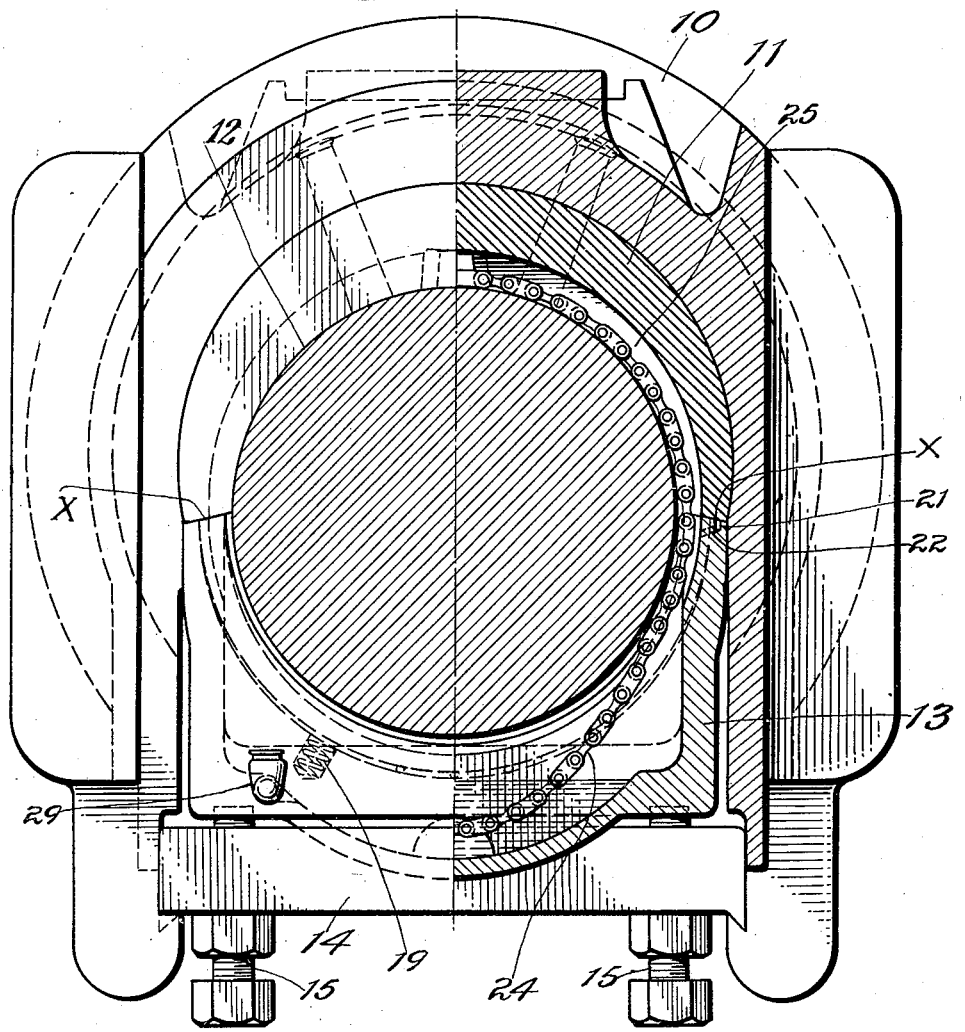

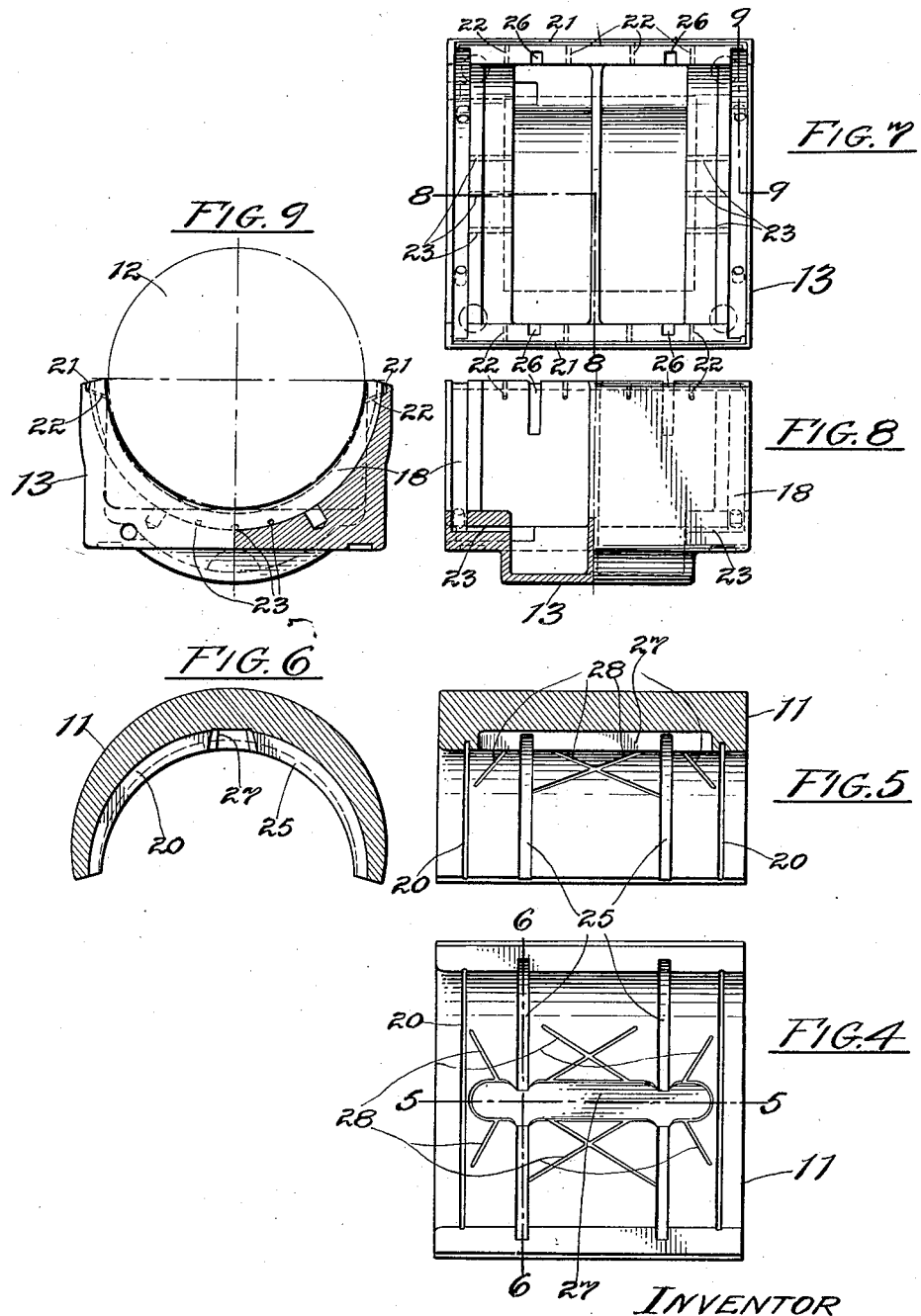

Patented Aug. 2, 1932

1,869,795

UNITED STATES PATENT OFFICE

JOSEPH N. BLUE, OF BIG SPRING, TEXAS

BOX AND BEARING FOR RAILWAY VEHICLES

Application filed August 12, 1930. Serial No. 474,757.

The hereinafter described invention relates to the boxes housing the bearings of locomotive and car axles and the lubrication of the journals thereof in their frictional engagement with these bearings.

Among the objects of the invention is the provision of a boxing residing around the journal of a locomotive or car axle in which the bearing for the journal is maintained in contact with the boxing as adapted to receive it, by the engagement of a lubricant holding receptacle and in such manner that the end faces of the bearing embraced within its longitudinally extending edges form with the longitudinally extending end faces of the lubricant holder a joint acting as a lubricant seal, and furthermore, to provide the lubricant holder in its arcuate engagement with the ends of the journal with automatic lubricant sealing means and a return system of lubricant channels to carry back surplus lubricant into the lubricant holder, whereby to effect complete seal of the lubricant supply within the holder for continued use against the bearing and journal surfaces, in fact, so that its passage to waste is prevented through the novel joint sealing construction of the invention, and the integrity of the journal and bearing surfaces is assured for continuous duty without failure and at a relatively low cost per engine mile through the maintenance of an adequate lubricant supply, which is not dissipated and does not dequire replenishing except by the wear of frictional engagement.

Another object of my invention is to provide in the boxing, bearing and lubricant holder of my new and novel construction, as described, a continuous lubricant feeding mechanism moving between the lubricant holder and the surface of the journal, which will carry the oil contained in the holder continuously on to the journal surface in efficiently lubricating the frictionally engaging surfaces of the journal and bearing and to preferably provide such lubricant carrying means in the form of a pick up ring or chain that will continuously dip into the oil within the holder and return any surplus oil thereto, the improvements of my invention acting to continuously flood the journal and bearing surfaces with oil from the bottom of the journal box in a sealed lubricant receptacle, thereby permitting the extended use of oil lubrication not now possible for locomotive driving boxes, truck trailer and tender boxes with its well known ability to reduce friction, cutting and scoring over bearings of this type, now lubricated with grease, and insuring to the heavy duty bearings and journals of this service an automatic feed of oil lubricant from a source which will not leak off and which will eliminate attention upon the part of engine crews and inspectors, other than the occasional filling of the lubricant holder.

A further object of my invention is to form a new and novel construction of boxing for the journals of locomotive and car axles in which the bearing thereof will be maintained in close contact with the crown or top of the box at all times by the holder as used for supplying lubricant to the journal and bearing faces and to adjustably confine the lubricant holder against a cross tie used to bind the bottom open end of the box together so that its sides will be held in alignment and the cross tie will serve as a substantial support for maintaining the lubricant holder in place in its adjustably confined position.

Another object of my invention is to provide a construction of bearing and lubricant reservoir housed in a boxing which will function together in effectiveness of oil distribution to the frictionally engaging surfaces of the bearing and journal and will return surplus oil to the reservoir, the shape and location of the oil channels and grooves in the bearing and reservoir being such as to effect not only a circumferential but a lateral feeding of the oil on the journal, the lateral feeding being accelerated when the box is in lateral motion, as is the case in locomotive journal boxes, thereby continuously covering the bearing surfaces with lubricant in a highly efficient manner.

In order to fully comprehend my invention, reference is made to the accompanying drawings in which, Fig. 1 is an illustrative embodiment in part sectional side elevation, showing its application to the driving box of a locomotive axle, the respective parts being assembled in position about the journal thereof.

Fig. 2 is an enlarged sectional view of the lubricant sealing rings as employed at either end of the lubricant holder to contact the circular periphery of the journal.

Fig. 3 is an end elevation partly in section of the assembled structure of Fig. 1.

Fig. 4 is a plan view of the bearing of my invention illustrating the arrangement of lubricant channels in the face of the bearing as contacting the journal of the axle, the channels of the lubricant feeding chains also being shown transversely to the bearing face.

Fig. 5 is a sectional elevation taken on line 5—5, Fig. 4, while,

Fig. 6 is a sectional elevation taken on line 6—6, Fig. 4.

Fig. 7 is a top plan view looking into the lubricant holder of my invention showing the channels and grooves as provided therein.

Fig. 8 is a side elevation partly in section taken on line 8—8, Fig. 7.

Fig. 9 is an end elevation also partly in section and taken on line 9—9, Fig. 7.

Referring to the drawings, numeral 10 denotes the driving box of a locomotive within which is incorporated the bearing 11 thereof adapted to fit the journal of the driving box axle 12. Positioned within the open end of driving box 10 as a closure therefor, is the lubricant holder 13.

In the embodiment of my invention applied to a locomotive driving box, as illustrated, the lubricant holder 13 is maintained in the driving box 10, by cross bars 14, in such manner that a longitudinal running joint is formed between the end faces of the lubricant holder 13 and the bearing 11, as denoted at X.

The screws 15, engaging the cross bars 14, serve to adjust the lubricant holder 13 into position against the bearing 11, and in so doing also act to hold the bearing 11 firmly in place in the closed end or crown of the driving box 10. It will be noted that the plane faces forming the open end of driving box 10, are held in spaced relation along the lower ends thereof by the cross bars 14, the latter serving as binders for holding the open ends of the driving box 10 in fixed alignment.

Residing at the ends of lubricant holder 13, is felt or equivalent joint forming packing 16 encased within housing 17. Housing 17 is slidably fitted in the grooves 18 of the lubricant holder 13, being brought into engagement with the ends of the journal of axle 12, by the springs 19, and sealing the ends of the bottom half of the journal circumferentially against oil leakage.

Residing in the face of bearing 11 in its contact with the journal of axle 12 and at either end thereof, are the oil grooves 20 which carry any surplus oil tending to work through the fit of bearing 11 endwise back into lubricant holder 13 with which their open ends are in communication, while in the longitudinally extending end faces of the lubricant holder 13, where it contacts the bearing 11, at X, are lubricant channels 21 and ducts 22 leading therefrom into lubricant holder 13. The ends of the channels 21 communicate with the ends of the grooves 18 containing the joint sealing packing 16, so that any surplus oil tending to work out between the joint face as formed between the packing 16 and the journal of axle 12 will be led back through the channels 21 and ducts 22 into the lubricant holder 13. Lubricant ducts 23 leading from the bottom of packing containing grooves 18 into lubricant holder 13 also provide that any surplus oil contained in the grooves 18 will be returned into the main oil supply within the holder 13.

In this new and novel way of my invention, I provide against the escapement of lubricant from the holder 13, maintaining the supply therein in a simple and practical manner, while sealing the bearing 11 and its journal both circumferentially and longitudinally against lubricant egress.

Having described the means of retaining the lubricant between the frictional surfaces of the bearing and journal as well as within the lubricant holder, I wish to now describe the mechanism for feeding the lubricant from the holder 13 on to the journal of axle 12 which consists in the present illustrated embodiment of my invention in the provision of chains 24, loosely mounted in closed loop over the journal so as to dip into lubricant within reservoir 13 and carry the oil therefrom to the face of the journal. The chains 24 work through grooves 25, made on the inner face of bearing 11, which retains them in position around the journal of axle 12. Cut outs or clearances, as denoted at 26, are made for the passage of chains 24 through the lubricant holder 13.

The chain grooves 25 communicate with a centre cavity 27 extending longitudinally of bearing 11 in the crown or top thereof. The cavity 27 is so formed as to extend beyond the ends of the chain grooves and is shaped with rounded ends which act as scoops to carry the oil as delivered by the chains 24 to the top of the journal of axle 12 to either side of bearing 11; the oil movement so occasioned being accelerated when the driving box 10 is in lateral motion, as occurs in the service of a locomotive axle box. Lubricant channels 28 communicating with longitudinally extending cavity 27 are also situated in the journal engaging face of bearing 11 to better effect the distribution of the lubricant. Lubricant is supplied to the lubricant holder 13 through filling inlet 29.

The construction of my invention effects the practical lubrication of heavy duty journals as encountered in locomotive and car service with oil as distinguished from grease, while keeping up the supply of the lubricant for long and continuous use by conserving it within its holder.

It is well known that oil possesses the advantage over grease for lubricating the heavily loaded bearings of locomotive and car equipment by preventing the rapid wear of the journal and that heating of the journal is not occasioned with oil lubrication as is the case with grease in order to effect its feed and movement on to the frictionally engaging surfaces, and consequently, the integrity of the journal is maintained against overheating and the life of the bearings in contact therewith materially extended.

I desire it to be understood that the new and novel features and advantages of my invention are equally applicable to the journals of the locomotive leading trucks and trailing wheels as well as to locomotive tender and car journals, and that the embodiment as illustrated and described is typical only of its construction and functioning.

Minor changes may be made in the physical embodiment of the invention within the scope of the appended claims without departing from the spirit thereof.

What I claim is:

1. In a journal box and bearing, in combination, a boxing surrounding the journal having an open end, a bearing in said boxing engaging the upper half of the journal, a lubricant holder slidably mounted in the open end of said boxing having longitudinally and transversely extending end faces, the longitudinally extending end faces of said holder abutting similar longitudinally extending end faces on said bearing and the transversely extending end faces thereof residing closely adjacent the journal and having joint packing therein, a distancing member across the open end of said boxing, said member having means for drawing the longitudinally extending abutting end faces of said holder and bearing together and drawing said joint packing into engagement with the journal, and lubricant carrying means forming a loop around said journal and passing through said bearing and lubricant holder.

2. In a journal box and bearing, in combination, a boxing surrounding the journal having an open end, a bearing in said boxing having a longitudinally running lubricant channel and lubricant grooves extending therefrom across its face, a lubricant holder slidably mounted in the open end of said boxing having longitudinally and transversely extending end faces, the longitudinally extending end faces of said holder abutting similar longitudinally extending end faces on said bearing and the transversely extending end faces thereof residing closely adjacent the journal and having joint packing therein, distancing members across the open end of said boxing, said members having means for drawing the longitudinally extending abutting end faces of said holder and bearing together and drawing said joint packing into engagement with the journal, and means looped around said journal and passing through said bearing for carrying lubricant from said holder into the longitudinally running lubricant channel of said bearing and lubricant grooves extending therefrom.

3. In a journal box, a bearing having longitudinally running end faces adapted to form joints, a lubricant holder in said box fitted under the lower half of the journal and having end faces running longitudinally and transversely to the journal, grooves in the transversely running end faces of said holder, packing resiliently held in said grooves, drain ducts leading from said grooves into said holder, channels in the longitudinally running end faces of said holder, drain ducts leading from said channels into said holder, joints on the longitudinally running end faces of said holder, chains residing loosely on top of the journal, passage ways through said bearing for said chains, said chains forming a loop around the journal and passing through said lubricant holder, a longitudinally running cavity in the top of said bearing extending between the passage ways for said chains and on either side thereof, grooves in the face of said bearing at either end thereof opening into the lubricant holder and means for drawing the longitudinally running joint faces of said holder and bearing into engagement and compressing said packing against the journal.

In testimony whereof, I have hereunto set my hand at Big Spring, Texas, this 9th day of August, 1930.

JOSEPH N. BLUE.